United States Patent Office 2,897,133
Patented July 28, 1959

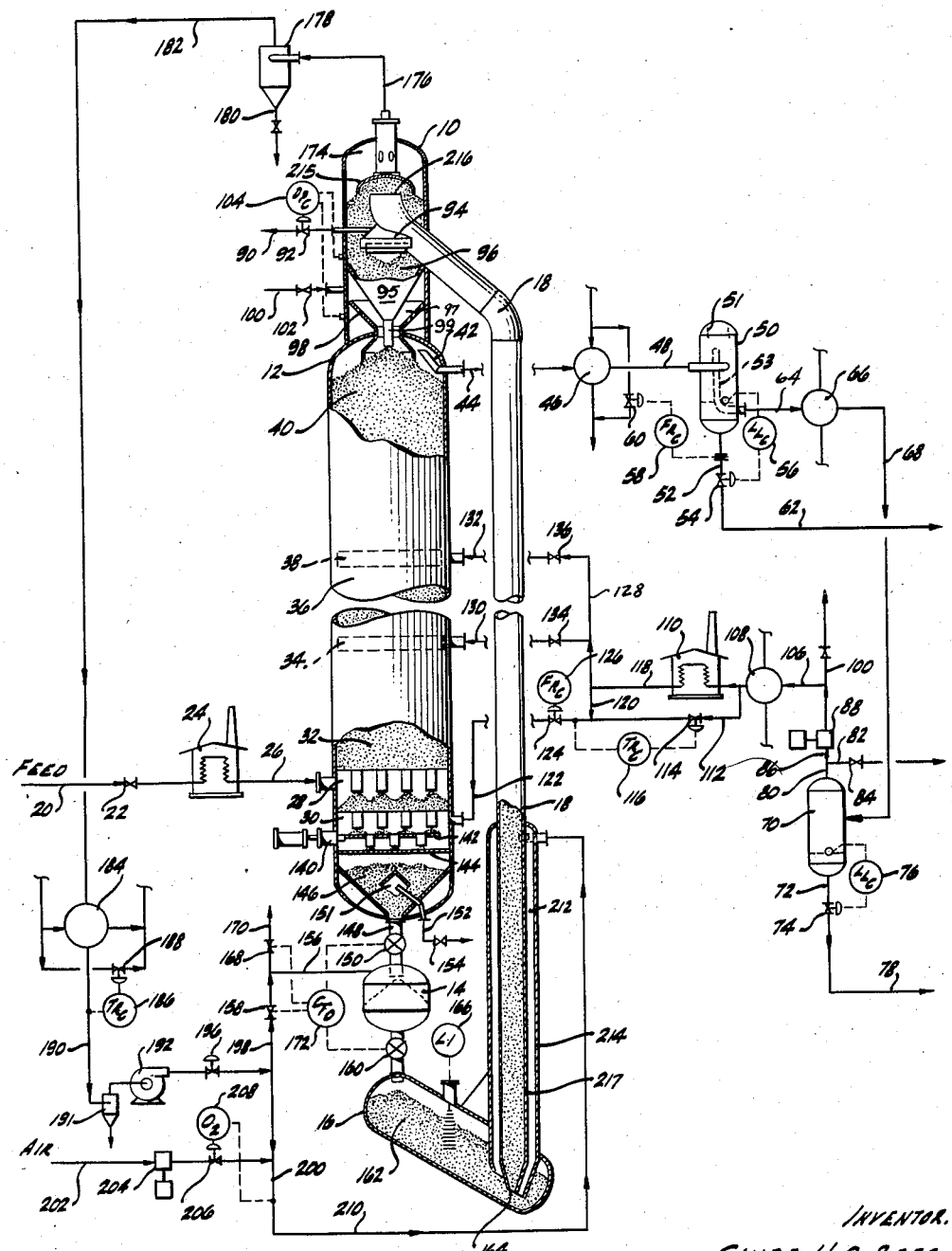

2,897,133

HYDROCARBON TREATMENT PROCESS AND APPARATUS

Clyde H. O. Berg, Long Beach, Calif., assignor to Union Oil Company of California, Los Angeles, Calif., a corporation of California Application June 25, 1954, Serial No. 439,443

10 Claims. (Cl. 208—103)

This invention relates to a continuous process and apparatus for the contacting of a fluid with a granular solid contact material and in particular relates to an improved process and apparatus for hydrocarbon conversions wherein a hydrocarbon stream is contacted with a stream of granular solid contact material, such as a granular solid hydrocarbon conversion catalyst, which material is recirculated successively through a contacting or reaction zone and through a solids regeneration or reheating zone. One specific feature of the present invention is an improved method and apparatus for treating the reaction effluent to remove therefrom undesirable high boiling materials which are present in relatively small proportions as discussed below.

In all such solids-fluid contact processes and particularly those which treat relatively low molecular weight fluids, such as are used in the treatment of gasolines and naphthas boiling below about 400° F., the product obtained nearly always contains a relatively small portion of higher boiling hydrocarbon derivative materials having boiling points running as high as 800° F. and whose presence is not detectable from Engler distillations. These are apparently formed during the processing by polymerization and other reactions to produce a so-called heavy end or polymer which is undesirable because of their detrimental effects in the finished product.

In the case of naphtha and gasoline production in which a petroleum naphtha, containing some unsaturated materials including olefins and diolefins, is treated, it is noted that upon standing in contact with air additional undersirable heavy hydrocarbon derivative materials are formed in the product which are referred to as gums. These materials appear to be oxygenated hydrocarbon derivatives and are primarily acids, both water insoluble and water soluble types, and about 10–15% unsaponifiable materials which are presumably aldehydes and ketones. When gasolines containing such materials are utilized as internal combustion engine fuels, these polymers and gum-like materials deposit on the surfaces of the engine intake system, valve stems, and the carburetor in the form of a hard dry resin-like material. This deposit ultimately interferes with valve action and impairs engine operation.

The conventional treatments which are required to remove these gum-like and heavy materials have in the past involved sulfuric acid treatments, as well as the contacting of the finished gasoline either in the vapor phase or liquid phase with adbsorbents such as Fuller's earth. Either of these treaments involves considerable equipment in the form of agitators, settlers, contacting columns, pumps and piping and is quite expensive. Accordingly, one modern practice is to inhibit the finished gasoline against gum formation. Such treatment does not permanently remove the undesirable gums but does delay the formation thereof upon standing.

With respect to the normally occurring heavy polymer, the conventional post treatment for the gasoline includes, in addition to the usual distillation for removing $C_3$ and lower molecular weight hydrocarbons therefrom, a so-called rerunning or redistillation step in which the desired gasoline stream is produced as a distillate or overhead product to separate it from a relatively minor heavier fraction. This treatment is also expensive because the vaporization of substantially all of the product is required and also because of the relatively extensive amount of equipment needed to carry out this additional distillation. Invariably during such redistillation, thermal decomposition produces additional polymers, although in minor amounts.

The present invention is directed to an improved hydrocarbon conversion process employing a recirculating solid contact material which preferably has catalytic activity for the production of improved gasolines and naphthas and in which the raw effluent from the reaction zone is treated prior to being condensed and fractionated whereby a substantially complete elimination of the undesired high molecular weight polymers and gum-forming materials is obtained. This step is carried out in exceedingly simple equipment providing for close control of the effluent treatment and permits the elimination of the usual post treating processes such as redistillation, sulfuric acid treatment, vapor phase adsorption, and the like.

It is accordingly a broad object of the present invention to provide an improved hydrocarbon conversion process employing a recirculating stream of granular solid contact material.

It is a more specific object of this invention to provide in the improved hydrocarbon conversion process a system for simply treating the raw effluent therefrom so as to remove high molecular weight undesirable materials prior to condensation of the effluent and its distillation to remove $C_3$ and lighter hydrocarbons.

It is a particular object of the present invention to provide a catalytic contact process for the production of high knock rating gasoline blending stock from relatively low grade naphtha which comprises contacting the naphtha in the presence of hydrogen with a reforming catalyst and cooling and partially condensing the raw effluent by decreasing its temperature to a point just below the dew point thereof so as to condense a closely controlled minor proportion of the effluent which has been found to prevent subsequent gum formation and remove undesirable high boiling polymers.

It is also an object of the present invention to provide an apparatus for effecting the foregoing objects.

Other objects and advantages of the present invention will become apparent to those skilled in the art as the description thereof proceeds.

Briefly, the present invention comprises an improved hydrocarbon conversion process in which the hydrocarbon to be treated is heated and vaporized and the resulting vapor passed through a moving bed of solid granular contact material at reaction conditions of temperature and pressure to produce a converted hydrocarbon material of improved physical and chemical properties. A specific embodiment of this invention involves the upgrading of low quality petroleum and other hydrocarbon fractions and the like in the presence of hydrogen and a cobalt molybdate desulfurization and reforming catalyst to produce an aromatic reactor effluent of reduced sulfur and nitrogen content having high antiknock qualities. This process is preferably carried out at an operating pressure of between about 50 p.s.i.g. to about 2000 p.s.i.g. and preferably about 400 p.s.i.g. and an average reaction temperature of between about 700° F to about 1100° F. and preferably about 900° F. in the presence of between about 500 and 10,000 s.c.f. of hydrogen per barrel of naphtha feed and preferably about 3750 s.c.f. of hydrogen per barrel of feed.

In the usual catalytic gasoline treating process, the reactor effluent is cooled and condensed to separate the hydrogen-containing recycle gas and the condensate is twice distilled, first to separate the $C_3$ and lighter hydrocarbons and second to remove the hydrocarbons boiling above about 400° F. from the desired gasoline product.

In the process of the present invention, the second distillation step or any other possible treating operations employed to remove the heavy polymer and gum-forming constituents is entirely eliminated. The effluent is cooled in stages so as to reduce its temperature after the first cooling stage to a point slightly below its dew point under the operating pressure and hydrogen concentration conditions which exist so as to cause a partial condensation of between about 0.01% and about 10% by volume of the reactor effluent in the ordinary case, and preferably between about 0.1% and about 5% by volume of this effluent to effect a condensation of the polymer and preformed gum present in the effluent. This step is performed immediately following the removal of the effluent from the reactor and the partially condensed effluent thus formed is discharged into a vapor liquid separator which is preferably of the cyclone type to permit removal of the heavy condensate formed.

In gasoline treating processes the temperature at which the effluent is removed is usually in the range of about 750° F. to 1000° F. and for gasoline the temperature to which it is initially cooled to effect the partial condensation will vary between about 350° F. and 550° F. depending upon the quantity of hydrogen and other light gases present and the operating pressure of the system. In the process of the present invention, it is not necessary to predetermine this temperature. Knowing the proportion of the effluent it is desired to condense, a flow recorder controller is employed to detect and maintain the flow of condensate equal to the desired volumetric proportion to be condensed leaving the vapor liquid separator. This flow controller is adapted to vary the flow of coolant employed to lower the temperature and partially condense the effluent. In cooperation with the flow controller a liquid level controller is employed in the vapor liquid separator to maintain a fixed level therein by controlling the rate at which the condensate is removed. In this manner the effluent is initially cooled to some temperature which need not be predetermined so as to condense the desired portion of the raw reactor effluent independently of considerations of hydrogen concentration in the effluent and the operating pressure.

The uncondensed portion of the effluent, which comprises more than 90% by volume thereof, is subsequently cooled in a second stage or stages to effect a substantially complete condensation of the treated gasoline. The uncondensed portion consists primarily of hydrogen-containing recycle gas which is recycled to the contacting zone. The condensate gasoline, free of the gum-forming and heavy polymeric materials, may be depropanized to produce a clean high quality gasoline product without the necessity of redistillation or rerunning or other of the heretofore required post treating operations.

The heavy polymeric material, separated in the initial cooling step, contains a relatively small amount of desired gasoline range hydrocarbons. In the process of this invention it is preferred to recirculate this heavy material to the feed preparation unit preceding the catalytic treatment and in which any residual gasoline product is recovered without the requirement of additional distillation facilities.

Prior to the experimental verification of the present invention in the reforming and desulfurization of petroleum naphthas in the presence of hydrogen and a cobalt molybdate catalyst, it was discovered that under certain conditions the A.S.T.M. gum of the finished product rose in many cases to as high as 20 or 25 milligrams per 100 cc. and thus required a two-stage distillation step to produce a stable finished gasoline. By employing the process of this invention in an apparatus which required only an additional cyclone and two control instruments, it was found that the A.S.T.M. gum could be reduced to less than 1.0 consistently by employing the initial cooling step of the present invention to condense about 2% of the hydrocarbon material contained in the reactor effluent. The second or redistillation step was entirely eliminated and the gasoline product produced has proved entirely satisfactory in every respect.

The present invention will be more readily understood by reference to the accompanying drawing which is a combination flow diagram of the process of this invention and a detailed drawing of an elevation view in partial cross section of the contacting and regeneration apparatus. The description of the drawing is conducted in terms of a specific example of the present invention as applied to the continuous reforming and desulfurization of a petroleum naphtha in the presence of hydrogen by means of a recirculating stream of cobalt molybdate catalyst to produce a desulfurized and aromatic gasoline blending stock.

Referring now more particularly to the drawing, the apparatus consists essentially of catalyst separator and pretreating chamber 10 into which the regenerated catalyst is discharged, naphtha reforming and desulfurization column 12 through which the catalyst passes downwardly as a moving bed by gravity, catalyst pressuring chamber 14 receiving spent catalyst from column 12, induction chamber 16 into which the spent pressured catalyst is discharged, and conveyance-regeneration chamber 18 through which the spent catalyst is conveyed and regenerated by means of a conveyance-regeneration fluid flow, and the regenerated catalyst is discharged for pretreatment and recirculation into separator chamber 10.

The apparatus of this invention as shown in the drawing is designed for the catalytic reforming and desulfurization of 1100 barrels per stream day of a petroleum naphtha having the following properties:

TABLE I

*Naphtha feed*

| | |
|---|---|
| Boiling range, ° F. | 241–418 |
| ° A.P.I. gravity | 46.3 |
| Sulfur, weight percent | 0.579 |
| Nitrogen, weight percent | 0.020 |
| Knock rating (F–3) | 73.0 |
| ASTM gum | 45.0 |

This naphtha feed is introduced through line 20 at a rate of 1100 barrels per day controlled by valve 22 and is preheated by exchange with hot regeneration gas recycle in interchanger 184 described subsequently and then is further heated and vaporized in fired heater 24. The naphtha vapor is introduced through transfer line 26 at a temperature of 900° F. and a pressure of 405 p.s.i.g. into naphtha engaging zone 28 in column 12. A primary stream of recycle gas containing hydrogen is introduced through primary recycle gas engaging zone 30 at a rate of 17 M s.c.f. per day and at a temperature of 900° F. The mixture of naphtha vapor and hydrogen passes upwardly through primary reforming zone 32 countercurrent to the downflowing bed of cobalt molybdate catalyst. Herein the cyclization of paraffin hydrocarbons takes place to form naphthenes and the endothermic aromatization of the naphthene hydrocarbons results in a temperature decrease. To maintain an approximately constant temperature profile throughout reaction column 12, a secondary hydrogen recycle stream is introduced into secondary recycle gas engaging zone 34 at a temperature of 1150° F. and at a rate at 1130 M s.c.f. per day to increase the temperature of the reacting mixture to about 910° F. The thus reheated mixture passes countercurrent to the catalyst through secondary reforming zone 36 wherein a further temperature decrease takes place due to the endothermic aromatization reactions. A tertiary stream of recycle gas at 1150° F. is introduced into tertiary recycle gas engaging zone 38 at a rate of 1290 M s.c.f. per day to raise the reactant mixture temperature again to about 910° F. The mixture then continues upwardly through tertiary reforming zone 40 from which the effluent is removed from disengaging zone 42 at a temperature of about 880° F. and at 400 p.s.i.g. through line 44.

The effluent vapor is passed through interchanger 46 wherein heat is recovered in depropanizing the product and for reheating the naphtha feed and is thereby cooled to a temperature of 450° F. which is just sufficiently below the dew point of the effluent to effect a partial condensation of polymeric high boiling hydrocarbon materials having substantial gum-forming tendencies when employed as internal combustion engine fuels. The cooled and partially condensed effluent then passes through line 48 and is introduced into separator 50 which is preferably a centrifugal separator of the Webre cyclone type. Herein the partial condensate, amounting to a very small part of the total effluent, is separated from the vapor and is removed through line 52 at a rate controlled by valve 54 in accordance with liquid level controller 56. Flow recorder controller 58, which is adjusted to maintain a predetermined rate of flow of condensate through line 52 operates coolant bypass valve 60 so that the hot effluent flowing through line 44 is cooled sufficiently to partially condense the desired proportion of the reactor effluent.

The separator 50 as employed in this specific process was a cylindrical vessel 18 inches inside diameter and 6.0 feet high. The cooled and partially condensed reactor effluent was introduced tangentially at a point 3.0 feet from the bottom, the condensate was removed through an outlet at the bottom of the vessel, and the non-condenser vapor was removed through an outlet conduit 53 which extended from a central point within the vessel near the top thereof and downwardly essentially along the vertical axis of the vessel and then through the wall near the bottom thereof. This permits a rapid rotation of the vapor within the vessel around the outlet pipe and an effective centrifugal separation of the heavy partial condensate which collects on and flows down the inside of the vessel wall. A drip ring 51 was incorporated in the top of separator 50 to prevent condensate entry into outlet pipe 53.

The preferred proportion so condensed is a very minor amount ranging from 0.01% up to about 10% by volume. Preferably this proportion is between about 0.1% and about 5% and in the experimental verification of the present invention it has been found that partial condensation of about 2.2% by volume is sufficient to substantially eliminate the so-called heavy ends or polymer from the effluent so as to avoid the usual necessity for rerunning the depropanized liquid product.

In the present invention, slightly more than 2% by volume of the effluent is condensed and is removed at a rate of 22 barrels per day by means of line 62. This material contains reformed gasoline boiling below about 420° F. and accordingly is returned for redistillation with the material from whch the naphtha feed to the process of this invention is prepared. This step, not shown for sake of simplicity in the drawing, is entirely conventional and effects a recovery of approximately 14.5 barrels of reformed gasoline boiling range product boiling below about 420° F.

The uncondensed portion of the effluent flows from cyclone 50 at a temperature of about 450° F. through line 64 and is further cooled and condensed in interchanger 66 in which heat is recovered by heat exchange with the hydrogen recycle gas as subsequently described. The condensed effluent together with the uncondensed hydrogen recycle gas flows through line 68 into product separator 70 in which the uncondensed gases are separated from the process product. The reformed naphtha product is removed through line 72 at a rate of 1118 barrels per day controlled by valve 74 in response to liquid level controller 76. This liquid is sent by means of line 78 to a conventional depropanizer, not shown, wherein propane and lighter hydrocarbon gases are separated to produce the reformed naphtha product of this invention. This product is produced at a rate of 1028 barrels per day and has the following properties:

TABLE II

*Reformed naphtha product*

| | |
|---|---|
| Boiling range, ° F. | 115–427 |
| A.P.I. gravity | 48.7 |
| Sulfur, weight percent | 0.007 |
| Nitrogen, weight percent | 0.001 |
| Knock rating (F–1+3 cc. TEL) | 93.7 |
| ASTM gum, mg./100 cc. | 2 |

The uncondensed portion of the effluent consists essentially of the hydrogen-containing recycle gas which is removed from separator 70 by means of line 80 and because of the net production of hydrogen in the process, the excess portion of this is bled from the system through line 82 at a rate of 140 M s.c.f. per day controlled by valve 84. Part or all of this gas may be employed as fuel in the fired heaters in the process if desired.

The remaining recycle gas is passed through line 86 and is compressed from 375 p.s.i.g. to 425 p.s.i.g. in recycle gas compressor 88. Part of this compressed recycle gas is passed as a regenerated catalyst pretreating gas through line 100 at a rate of 165 M s.c.f. per day controlled by valve 102 into separator and catalyst pretreating chamber 10. This pretreating gas is introduced below cone-shaped baffle 95 and passes therefrom downwardly through the annular space within the lower periphery of baffle 98 and then directly into the top of the bed of regenerated catalyst in chamber 10. A first part of this gas passes upwardly through sealing leg 99 and pretreating zone 96 countercurrent to the regenerated catalyst. By means of this countercurrent passage of gas the catalyst is pretreated with hydrogen to reduce the higher oxides of cobalt and molybdenum formed during regeneration to the lower oxides. The pretreating gas, along with excess regeneration gas coming down from the top of the lift line, are removed from beneath baffle 94 through line 90 controlled by valve 92. The remaining portion of the pretreating gas introduced through line 100 and passed downwardly into the top of reactor 12, passes radially outwardly below the lower periphery of baffle 98 and is disengaged from the catalyst bed with the total reactor effluent in disengaging zone 42 at points around the lower periphery of baffle 98 and through line 44, and acts as a seal gas preventing the upflow of reactor effluent into the pretreating chamber 10. The spent pretreating gas and excess regeneration gas are removed from separator chamber 10 at a point below baffle 94 through line 90 at a rate of 205 M s.c.f. per day controlled by valve 92 which in turn is actuated by differential pressure controller 104 to maintain a positive pressure differential between the top and the bottom of catalyst pretreating zone 96, that is, the pressure above cone-shaped baffle 95 is slightly less than the pressure below it and within baffle 98.

The remaining portion of the compressed recycle gas flows at a rate of 4120 M s.c.f. per day through line 106 and is preheated in interchanger 108 to 350° F. in exchange with the reactor effluent after polymer removal (interchanger 66).

Of this preheated recycle gas, 3460 M s.c.f. per day are further heated in fired preheater 110 to a temperature of 1150° F., and 660 M s.c.f. per day passed through bypass line 112 at a rate controlled by valve 114 in response to temperature recorder controller 116. The primary hydrogen recycle gas, introduced into engaging zone 30 at a rate of 1700 M s.c.f. per day and at 900° F., is produced by mixing 1040 M s.c.f. per day of 1150° F. hydrogen flowing through lines 118 and 120 with the 660 M s.c.f. per day of cooler hydrogen from line 112 and this material is then introduced through line 122 into the primary recycle gas engaging zone 30 at a rate controlled by valve 124 in response to flow recorder controller 126.

The remaining recycle gas at 1150° F. passes through manifold 128 and constitutes the secondary and tertiary recycle gas streams mentioned previously. These streams are introduced into engaging zones 34 and 38 through lines 130 and 132 at rates of 1130 M s.c.f. per day and 1290 M s.c.f. per day controlled by valves 134 and 136 respectively.

The spent hydrocarbonaceous catalyst passes downwardly through the column 12 at a rate controlled by solids feeder and stripper 140 which is provided with a reciprocating tray 142 and a lower stationary tray 144 so that upon reciprocation of tray 142 a substantially constant volumetric withdrawal of spent catalyst uniformly throughout the cross-sectional area of column 12 is achieved. Spent catalyst from feeder 140 accumulates as bed 146 which constitutes a surge volume, the level of which rises and falls as granular solids are withdrawn from the bottom of the column periodically through outlet 148 controlled by motor valve 150.

The spent solids are thus discharged into pressuring chamber 14 when it is depressured to about 400 p.s.i.g. causing a displacement gas to flow upwardly through outlet 148 into the bottom of reactor 12. A seal gas comprising a mixture of this last-named gas and a small portion of the primary recycle gas stream, which passes downwardly through solids feeder 140, is removed from disengaging zone 151 through line 152 at a rate of 140 M s.c.f. per day controlled by valve 154. This gas is mixed with the spent catalyst pretreating gas removed from the upper part of the column through line 99 and is employed as fuel.

The spent granular solids in pressuring chamber 14 are raised in pressure to 430 p.s.i.g. by the introduction of regeneration recycle gas through manifold 156 upon the opening of valve 158 described below. Following this pressuring step, valve 160 is opened and the pressured solids are discharged by gravity into induction chamber 16 to maintain the downwardly flowing bed 162 of spent granular catalyst to be conveyed and regenerated so as to submerge the lower inlet opening 164 of the conveyance-regeneration chamber. Level indicator 166 is provided to indicate the solids level of bed 162.

Valve 160 is then closed, motor valve 168 is then opened, and pressuring vessel 14 is depressured from 430 pounds to about 400 pounds by the discharge of gas through lines 156 and 170. Valve 168 is then closed and valve 150 is reopened to remove additional spent catalyst and the solids pressuring cycle is repeated. The operation of motor valves 150, 158, 160, and 168 is controlled in sequence by cycle timer operator 172 so as to receive solids, pressure, discharge solids, and depressure at a rate sufficient to charge solids into induction chamber 16 at a rate equal to the solids circulation rate set by solids feeder 140.

Referring now to solids pretreater and separator 10, spent regeneration gases collecting in space 174 are removed therefrom through line 176 at a rate of 1612 M s.c.f. per day and a temperature of 984° F. This gas is passed into solids separator 178 wherein any catalyst fines elutriated from the catalyst stream in separator 10 are removed from the regeneration gas recycle. These solids are removed from separator 178 by means of line 180. The solids free recycle gas then flows through line 182 through heat exchanger 184 in exchange with raw naphtha feed referred to above and is therein cooled to a temperature of about 640° F. This temperature is controlled by temperature recorder controller 186 which operates bypass valve 188 so as to control the naphtha coolant passing through interchanger 184. The cooled recycle gas passes through line 190 and condensate separator 191 and is compressed to 430 p.s.i.g. in compressor 192. This recycle gas then flows through line 194 at a rate controlled by valve 196 and is divided into a solids pressuring stream flowing through line 198 to pressure solids in chamber 14, and a conveyance-regeneration stream flowing from line 200.

An oxygen-containing gas, such as air is introduced via line 202. It is compressed to 433 p.s.i.g. in compressor 204 and is introduced at a rate of 123 M s.c.f. per day controlled by valve 206 in response to oxygen recorder controller 208 for combination with the compressed conveyance-regeneration recycle gas flowing through line 200. The combined oxygen-containing conveyance-regeneration gas, which may contain from about 0.1 to about 10% oxygen and preferably from 0.5 to 5.0% oxygen, then passes at a temperature of about 646° F. and at a rate of 1735 M s.c.f. per day through line 210 tangentially into the upper portion of regenerator heat exchange zone 212. This zone is contained within the annulus between the lower portion of conveyance-regeneration conduit 18 and jacket 214 which surrounds concentrically the lower portion of the conveyance-regeneration conduit. The regeneration gas passes downwardly through zone 212 and is preheated therein by means of the exothermic heat of regeneration liberated within the lower part of conveyance-regeneration zone 18 to a temperature of about 706° F. This preheated gas is injected directly into induction chamber 16 at a point below the level of the spent catalyst to be conveyed, it passes into inlet 164 of the conveyance-regeneration zone, and then upwardly therethrough at a rate sufficient to effect conveyance and regeneration of the spent catalyst.

The regenerated solids discharge at outlet 216 against cap 215 which applied a force against the solids stream issuing from the outlet to maintain the catalyst solids during regeneration as a moving mass having a density substantially equal to the static bulk density. The regenerated catalyst is discharged against baffle 215 which applies a force against the mass of catalyst issuing from conveyance-regeneration conduit 18 and maintains the upwardly moving catalyst at a bulk density substantially equal to the static bulk density thereof.

As stated above, the major part of the coke burn-off from the catalyst occurs in the lower or first part of the conveyance-regeneration zone and a substantial part of this endothermic heat is transferred through the conveyance conduit wall to preheat the conveyance-regeneration gas recycle and to keep the inner conveyance-regeneration conduit wall 217 cool. All of the net endothermic heat of regeneration however is removed as sensible heat in the conveyance-regeneration recycle, with the exception of usual heat losses.

The spent granular catalyst is substantially completely regenerated while passing upwardly through the conveyance-regeneration conduit and is discharged from outlet opening 216 of the conveyance conduit into separator chamber 10 previously described.

Because of the fact that the granular catalyst is maintained as a dense upwardly moving compact bed substantially at the static bulk density of the catalyst, the upward velocity and accordingly the residence time of the spent catalyst in the regeneration system is not limited by the height of the conveyer regenerator or by the velocity of the conveyance-regeneration fluid circulated therethrough, as is the case in the conventional gas-lift or suspended solids systems. Once the conveyance fluid rate is sufficient to exceed the opposing forces of gravity and friction on the moving bed, the catalyst will move as continuously fed at the inlet and removed from the outlet. Any necessary increases in conveyance-regeneration fluid rate to remove heat from the system have absolutely no effect whatsoever upon the residence time of the catalyst in the system or the degree to which it is regenerated and the only external effect is one of a somewhat increased pressure differential.

Accordingly in the present process the spent catalyst may be completely regenerated by the removal of the entire quantity of hydrocarbonaceous deactivating materials during conveyance. In the present example, this is accomplished by utilizing an oxygen concentration of about 2.0% at the inlet of the conveyance-regeneration zone. The spent catalyst contains about 4.1% carbon and is discharged into separator 10 after regeneration containing less than about 0.05% carbon and the restoration of activity is essentially 100%.

In the apparatus of this invention, the entire structure above grade level is about 55 feet in height, the reactor column diameter is 4 feet 6 inches, and the conveyance-regeneration conduit is 14-inch schedule 40 pipe. The catalyst is circulated at a rate of 10.3 tons per day and moves at an upward velocity of 15 feet per hour through the regeneration-conveyance conduit. This low conveyance velocity is totally impossible to maintain in a gas-lift or pneumatic conveyer transferring suspended solids, and herein it permits the complete regeneration of the catalyst during the lifting step.

It is not intended that the above detailed description of the process of this invention as applied to cobalt molybdate reforming and desulfurization of gasoline be considered limiting because the effluent treating process hereinabove described may just as well and with comparable advantageous results be applied to the effluent gasolines removed from any gasoline treating process involving a catalyst or other contact material and elevated reaction temperatures. It should be understood also that even in the treatment of heavier hydrocarbon stocks in the vapor phase, such as in the desulfurization and denitrogenation of gas-oils for the preparation of diesel fuels or burning oils or the preparation of cracking stock, the principles of the present invention may be applied to remove from such effluent still higher boiling constituents and polymers which have analogous detrimental effects in the heavier hydrocarbon material produced. Adverse effects would be noted in diesel engines due to these heavier materials and the presence of relatively small quantities of very heavy materials in prepared gasoline cracking stocks causes an adverse effect in the form of excess coke laydown on the catalyst. Accordingly it is intended that this invention apply generally to the treatment of reactor effluents to remove traces of detrimental high boiling materials.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for the conversion of gasoline boiling range hydrocarbons which comprises maintaining a conversion zone containing a granular solid hydrocarbon conversion contact material, and passing a gasoline boiling range hydrocarbon through said conversion zone at gasoline conversion conditions of pressure, temperature, and composition to produce a converted gasoline vapor containing a relatively small amount of detrimental hydrocarbon derivatives of high boiling range, the improved method of treating the effluent converted gasoline vapor from said conversion zone to remove said detrimental hydrocarbon derivatives and eliminate necessity for redistillation thereof as an overhead product which comprises passing said effluent gasoline into a first cooling zone, passing a coolant therethrough to cool said effluent to a temperature below its dew point to condense between about 0.5% and about 5% by volume of said effluent forming a first condensate containing said detrimental hydrocarbon derivatives and leaving an uncondensed portion, passing the mixture tangentially into a separator zone, centrifugally separating said first condensate from said uncondensed portion of effluent vapor, maintaining a liquid level of said first condensate in said separator zone by detecting said level and controlling the rate of removal of said first condensate therefrom, controlling the degree of condensation in said first cooling zone by detecting the rate of flow of said first condensate from said separator zone and controlling the rate of flow of said coolant through said first cooling zone in accordance therewith, and subsequently further cooling said uncondensed portion of effluent vapor in a second cooling zone to form a second condensate comprising the liquid gasoline conversion product substantially free of said detrimental hydrocarbon derivatives without the necessity of rerunning said liquid product.

2. A process according to claim 1 wherein said granular solid contact material comprises a hydrocarbon conversion catalyst.

3. A process according to claim 2 in combination with the steps of recirculating said conversion catalyst downwardly as a moving bed through said conversion zone, regenerating spent catalyst removed therefrom in a regeneration zone, and returning the regenerated catalyst to said conversion zone.

4. A process according to claim 2 wherein said catalyst comprises cobalt molybdate, said gasoline boiling range hydrocarbon comprises a petroleum naptha, and said hydrocarbon conversion conditions are maintained at values between about 700° F. and 1100° F., between about 50 p.s.i.g. and 2000 p.s.i.g., and a gas containing hydrogen is passed through said conversion zone with the naptha at a rate between about 500 s.c.f. and 10,000 s.c.f. per barrel of naptha to desulfurize and reform said naptha to produce high quality, substantially gum-free gasoline.

5. A process according to claim 4 in combination with the steps of passing the second condensate and uncondensed gas from said second cooling zone into a second separator zone, separating the uncondensed gas containing hydrogen therein from said second condensate, and recirculating at least part of said uncondensed gas containing hydrogen as a recycle gas through said conversion zone with said naptha.

6. A method for removing detrimental hydrocarbon derivatives of high boiling range such as gum from the gasoline effluent vapor from a gasoline conversion operation which comprises passing said gasoline effluent into a first cooling zone, passing a coolant therethrough to cool said effluent to a temperature below its dew point to condense between about 0.5% and about 5% by volume of said effluent forming a first condensate containing said detrimental hydrocarbon derivatives and leaving an uncondensed portion, passing the mixture tangentially into a separator zone, centrifugally separating said first condensate from said uncondensed portion of gasoline effluent vapor, maintaining a liquid level of said first condensate in said separator zone by detecting said level and controlling the rate of removal of said first condensate therefrom, controlling the degree of condensation in said first cooling zone by detecting the rate of flow of said first condensate from said separator zone and controlling the rate of flow of said coolant through said first cooling zone in accordance therewith, and subsequently further cooling said uncondensed portion of gasoline effluent vapor in a second cooling zone to form a second condensate comprising the liquid gasoline product substantially free of said gums without the necessity of rerunning said liquid product.

7. An apparatus for treating effluent vapor containing undesirable contaminants of high boiling point to remove such contaminants without redistilling the effluent after complete condensation which comprises, in combination with an apparatus from which said effluent vapor is produced, a first cooler, means for passing a coolant therethrough, means for passing the vapor to be treated therethrough, a vapor liquid separator vessel, inlet means for passing cooled and partially condensed effluent thereinto from said first cooler, an outlet for liquid from said separator vessel, control valve means in said outlet, a liquid level controller responsive to liquid level in said separator vessel and connected to actuate said control valve means to maintain said level, a flow recorder controller instrument responsive to the rate of flow of liquid through said outlet and connected to a control means for varying the flow of said coolant through said first cooler so as to maintain a substantially constant flow of liquid from said separator, and an outlet for uncondensed vapor opening from said separator vessel.

8. An apparatus according to claim 7 wherein said separator vessel comprises a vertically elongated pressure resistant vessel, said inlet means opens thereinto tangentially at an intermediate point, said outlet for liquid opens from the bottom of said separator vessel, and said outlet for uncondensed vapor comprises a conduit having an open end disposed at a central point within said vessel near the top thereof and which extends downwardly substantially along the vertical axis of said vessel and opens through the separator vessel wall at a point near the bottom thereof.

9. In an apparatus for contacting a fluid stream under conversion conditions of temperature, pressure, and composition with a solid granular contact material which comprises a contacting vessel containing a granular solid contact material, and inlet and outlet means for passing a fluid to be contacted into and through said vessel in direct contact with said granular contact material from said inlet to said outlet conduit means, the improved apparatus for treating effluent vapor containing undesirable contaminants of high boiling point to remove such contaminants without redistilling the effluent after complete condensation which comprises, in combination with an apparatus from which said effluent vapor is produced, a first cooler, means for passing a coolant therethrough, means for passing the vapor to be treated therethrough, a vapor liquid separator vessel, inlet means for passing cooled and partially condensed effluent thereinto from said first cooler, an outlet for liquid from said separator vessel, control valve means in said outlet, a liquid level controller responsive to liquid level in said separator vessel and connected to actuate said control valve means to maintain said level, a flow recorder controller instrument responsive to the rate of flow of liquid through said outlet and connected to a control means for varying the flow of said coolant through said first cooler so as to maintain a substantially constant flow of liquid from said separator, and an outlet for uncondensed vapor opening from said separator vessel.

10. A method for removing detrimental hydrocarbon derivatives of high boiling range such as gum from the gasoline effluent vapor from a gasoline conversion operation which comprises passing said gasoline effluent into a first cooling zone to cool said effluent to a temperature below its dew point to condense between about 0.5% and about 5% by volume of said effluent, thereby forming a first condensate containing said detrimental hydrocarbon derivatives and leaving an uncondensed portion, passing the mixture tangentially into a separator zone, centrifugally separating said first condensate from said uncondensed portion of gasoline effluent vapor, maintaining a liquid level of said first condensate in said separator zone by detecting said level and controlling the rate of removal of said first condensate therefrom, controlling the degree of condensation in said first cooling zone by detecting the rate of flow of said first condensate from said separator zone and controlling the degree of cooling of said gasoline effluent in said first cooling zone in accordance therewith, and subsequently further cooling said uncondensed portion of gasoline effluent vapor in a second cooling zone to form a second condensate comprising the liquid gasoline product substantially free of said gums without the necessity of rerunning said liquid product.

References Cited in the file of this patent

UNITED STATES PATENTS

| 1,423,064 | Amend | July 18, 1922 |
| 1,933,107 | Gohr | Oct. 31, 1933 |
| 1,986,165 | Sieck | Jan. 1, 1935 |
| 2,119,350 | Pier et al. | May 30, 1938 |
| 2,335,610 | Plummer | Nov. 30, 1943 |
| 2,398,213 | Dutson et al. | Apr. 9, 1946 |
| 2,534,025 | Howes et al. | Dec. 12, 1950 |
| 2,560,645 | Hays | July 17, 1951 |
| 2,665,239 | Howard et al. | Jan. 5, 1954 |
| 2,689,823 | Hardy et al. | Sept. 21, 1954 |
| 2,700,638 | Friedman | Jan. 25, 1955 |

UNITED STATES PATENT OFFICE

CERTIFICATE OF CORRECTION

Patent No. 2,897,133                                        July 28, 1959

Clyde H. O. Berg

It is hereby certified that error appears in the printed specification of the above numbered patent requiring correction and that the said Letters Patent should read as corrected below.

Column 1, line 62, for "adbsorbents" read -- adsorbents --; column 4, line 59, for "17 M s.c.f." read -- 1700 M s.c.f. --; column 5, line 36, for the syllable "denser" read -- densed --.

Signed and sealed this 1st day of March 1960.

(SEAL)
Attest:

KARL H. AXLINE                                        ROBERT C. WATSON
Attesting Officer                                    Commissioner of Patents